F. A. MEIER.
CUTTER.
APPLICATION FILED OCT. 20, 1906.
928,681.
Patented July 20, 1909.
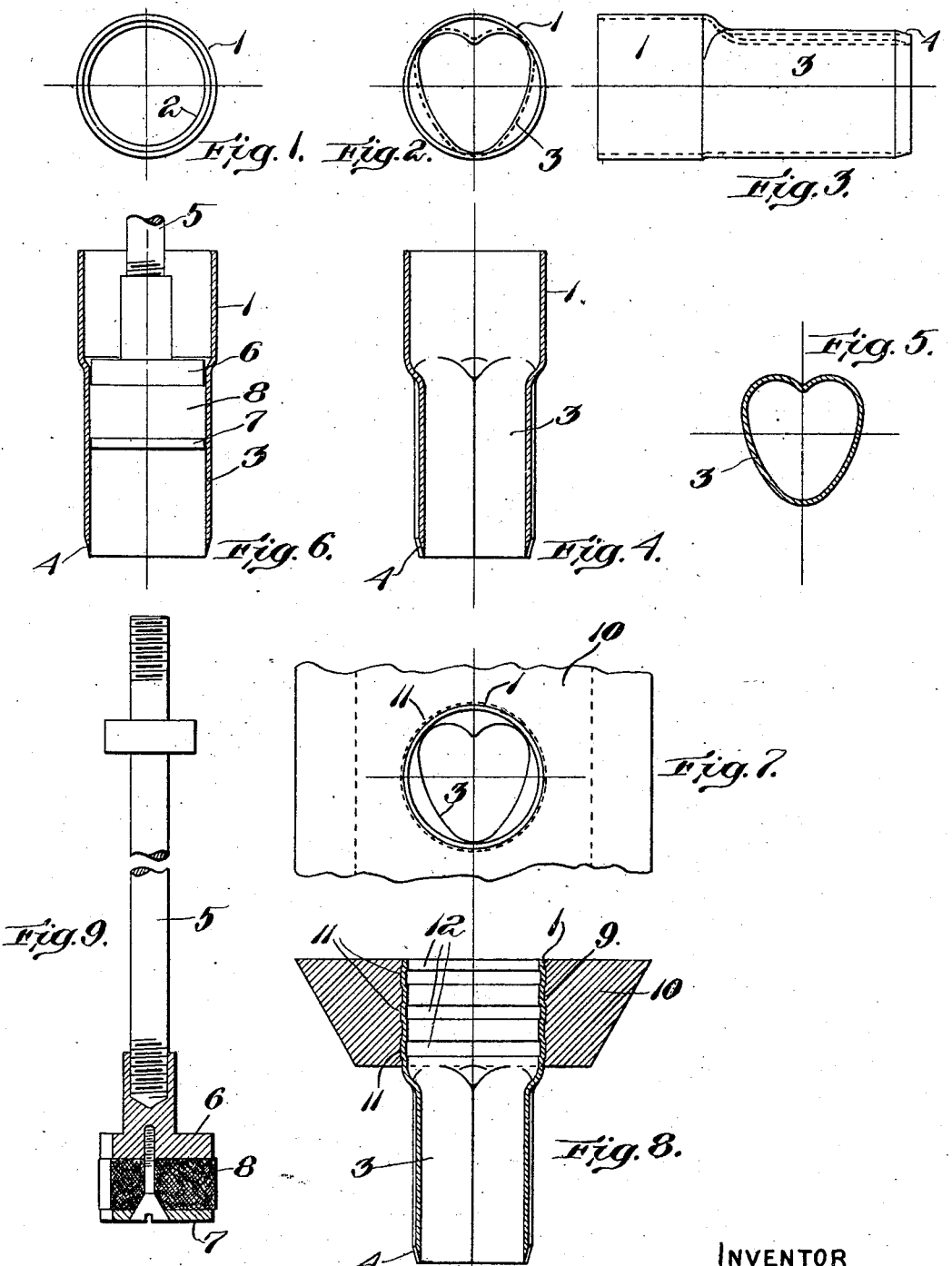

UNITED STATES PATENT OFFICE.

FREDERICK A. MEIER, OF NORFOLK DOWNS, MASSACHUSETTS, ASSIGNOR, BY MESNE ASSIGNMENTS, TO NATIONAL WAFER COMPANY, OF BOSTON, MASSACHUSETTS, A CORPORATION OF MAINE.

CUTTER.

No. 928,681.      Specification of Letters Patent.      Patented July 20, 1909.

Application filed October 20, 1906. Serial No. 339,750.

*To all whom it may concern:*

Be it known that I, FREDERICK A. MEIER, a citizen of the United States, and resident of Norfolk Downs, in the county of Norfolk and State of Massachusetts, have invented new and useful Improvements in Cutters, of which the following is a specification.

My invention relates to the construction of cutting devices for use in machines designed for cutting out articles of any desired shape from a sheet or similar mass of paste, dough or the like. Such devices are used in machines for making candy and lozenges, machines for making crackers, etc. The machines of this character in themselves form no part of my present invention, which relates merely to the cutting devices; my improved cutting device however is adaptable to all such machines and is equally useful whatever be the specific purpose or kind of work to which the said machines are put.

Inasmuch as the lozenge making machine of U. S. Patent No. 803,017, Oct. 3, 1905, is sufficiently characteristic of the kind of machine to which my invention is applicable, I will address my description to an embodiment of my invention suitable for use in a machine of that class. I desire to have it clearly understood, however, that I do not limit my invention to its use in that machine, or any confectionery machine, but claim it broadly for all machines of the character wherein such cutters are used.

Referring to the drawings which illustrate one embodiment of my invention and in which like reference-numerals indicate like parts in all the figures,—Figure 1 is a plan view of a piece of tubing of which my cutter is made, after the completion of the first step in the process of the manufacture of my cutter; Fig. 2 is a plan view of a completed cutter in which the cutting part of the cutter is made heart-shaped; Fig. 3 is a side view of the cutter shown in Fig. 2;
Fig. 4 is a longitudinal section of the cutter; Fig. 5 is a horizontal cross section of the heart-shaped part of the cutter; Fig. 6 is a longitudinal section of the cutter showing the plunger or piston therein; Fig. 7 is a plan view of a part of the cutter-head with the cutter secured therein; Fig. 8 is a longitudinal section of the cutter secured within the cutter-head; and Fig. 9 is a view partly in section of the plunger or piston.
While I have shown an embodiment of a cutter adapted to cut heart-shaped lozenges or other articles, it will be understood that this is merely by way of illustration and that my invention contemplates the use of any other design, such as a star, oval, triangle or other arbitrary shape. It will also be understood that, while I have illustrated only one cutter in the drawings, it is customary to use a large number of similar cutters set in one cutter-head or cutter-bar as shown in the patent above referred to. The cutter bar carrying the cutters is then given a reciprocating motion and all the cutters simultaneously cut lozenges or the like from a sheet of paste.

So far as I am aware it has hitherto been the practice in constructing such cutting devices to shape the hollow cutters throughout their entire length into the form desired for the lozenge or the like, and to cut holes of a corresponding shape and size in the cutter-head or bar, and then to solder or sweat the hollow cutters into the holes of the cutter head. When the cutters are circular and the holes in the cutter head are correspondingly made round there is no serious objection to this method of construction. But when the cutters are of some non-circular form, such as heart-shaped, great difficulty and expense is experienced in forming the holes in the cutter-head to correspond with the shape of the cutters. Round holes can readily be bored or reamed out, but holes of other shapes necessarily have to be filed out, and this largely by hand, thus making the construction of a cutter-head with a large number of cutters exceedingly slow and expensive, and the head or bar itself liable to irregularities. Moreover, when the cutters are soldered or sweated into their sockets in the cutter-head they can be removed only with difficulty and with liability of injury, if it is desired to remove them when they have become dull or damaged in use. All these objections are overcome by my invention which requires only circular apertures or sockets in the cutter-head, no matter what the shape of the cutting end of the cutter, and which dispenses with the soldering or sweating of the cutters into the apertures of the cutter-head.

In carrying out my invention I use a section of brass or other suitable metal tubing, of cylindrical form and a little smaller in diameter than the holes in the cutter-head in which the cutter is to be secured. I then expand the tubing for a part of its length at one end to the size of the hole in the cutter-head. The circular expanded part of the tubing, which forms the base of the cutter is shown at 1; the original part of the tubing to be formed into the cutting end is shown at 2 (see Fig. 1). The cutting end of the tubing is then formed by dies into the desired shape extending from the expanded circular part to the cutting edge, as shown at 3. The end of the shaped or non-circular part is beveled to provide a suitable cutting edge 4.

The plunger or piston shown in Figs. 6 and 7 is composed of a rod 5, to which is secured the head piece 6; between the head piece 6 and the plate or washer 7 is clamped a layer of felt 8 or other suitable material to make a close sliding contact with the inner walls of the non-circular part of the cutter. The piston head made up of parts 6, 7 and 8, is of the same shape as the cutting end, and forming a practically air tight contact therewith, forces the lozenge by air pressure out of the cutter after the cutting operation. The operation of the plunger and cutters are sufficiently described in the above mentioned patent. As the plunger has to go completely through the hollow cutter it will be seen that the diameter of the circular base part must be equal to or greater than the greatest diameter of the non-circular, or cutting part, of the cutter, otherwise the plunger which tightly fits the cutting part could not pass through the circular base of the cutter; also that viewed in plan, the non-circular part, whatever its shape, must be wholly inscribed within the circular base. It is for these reasons that I first enlarge the circular base, otherwise when shaping the cutting end with dies some points thereof would be likely to be forced out beyond the circular base, which must in the finished article circumscribe all points of the cutting end. It is conceivable that the cutting end could be formed in such way that no part of it would be forced outside the original compass of the tubing, but in practice it will usually be found necessary first to enlarge the base of the cutter.

My method of securing the cutter to the cutter-head or bar without soldering or sweating is as follows: Upon the inner walls of the round apertures 9 in the cutter-head or cutter-bar 10, I provide one or more annular grooves or channels 11. The circular base 1 of the cutter is then set into the aperture 9 and by the use of an appropriate tool, annular parts of the base 1 are expanded into the channels 11, as shown at 12, thus rigidly securing the cutter to the cutter-head. If the cutting edge becomes damaged or dull and it is desired to remove it and insert another, the defective cutter can readily be driven from its aperture without injuring the cutter-head, and without loosening or otherwise damaging the fastenings of the other adjacent cutters, as would happen if the cutters were soldered or sweated in place and heat were applied to enable one to be removed.

When, as shown in Figs. 1 and 6, the cutting part of the tube is cylindrical, as well as the base, the expansion of the base portion leaves an internal shoulder, more or less tapering; and in such forms as shown in Figs. 3, 4, 7 and 8, where the cutting portion is non-circular in cross section, this shoulder is of irregular width, according to the variations in internal diameter of the cutting portion of the tube. Whenever it is necessary to remove a cutter for resharpening or replacement, a cylindrical tool, which nearly fits the cylindrical base of the tube, is inserted from the back of the cutter head until the end thereof bears on the internal shoulder of the tube, when a sharp blow on the removing tool will suffice to start the base of the tube from its seat in the cutter head. For the purpose of easy removal of the cutting tubes it is therefore necessary to have its base substantially cylindrical in form, so that the tool may be readily inserted to do the work of driving the tube out of the cutter head.

I claim:

In a machine of the character described, the combination of a cutter head provided with a circular aperture, the walls of said aperture having an annular groove, a tubular cutter open at both ends, secured in the cutter head aperture; said tubular cutter having a cylindrical base, and a cutting end, the internal diameter of the cylindrical base being greater than the internal diameter of the cutting head, the transition in internal diameter being abrupt to form an internal shoulder adapted to resist a driving out mandrel, said cylindrical base fitting in the cutter head aperture, and having an annular rib fitting the said annular groove.

Signed by me at Boston, Massachusetts, this twelfth day of October, 1906.

FREDERICK A. MEIER.

Witnesses:
JOSEPH T. BRENNAN,
CASPAR ROGERS.